United States Patent
Bauer et al.

[11] Patent Number: 5,951,108
[45] Date of Patent: Sep. 14, 1999

[54] JOINT FITTING OF A BACKREST FOR A MOTOR VEHICLE SEAT

[75] Inventors: Heinz Bauer; Burckhard Becker; Ernst-Reiner Frohnhaus, all of Solingen, Germany

[73] Assignee: C. Rob. Hammerstein GmbH & Co KG, Solingen, Germany

[21] Appl. No.: 08/960,680

[22] Filed: Oct. 30, 1997

[30] Foreign Application Priority Data

Oct. 31, 1996 [DE] Germany .................... 196 44 087

[51] Int. Cl.⁶ ..................................... B60N 2/22
[52] U.S. Cl. .................. 297/378.12; 297/378.1; 297/378.13; 297/376; 297/354.1
[58] Field of Search ............... 297/378.12, 378.1, 297/354.1, 376, 378.13

[56] References Cited

U.S. PATENT DOCUMENTS

| | | | |
|---|---|---|---|
| 3,740,791 | 6/1973 | Bulin | 297/376 X |
| 4,717,204 | 1/1988 | Tezuka | 297/378.12 X |
| 5,116,102 | 5/1992 | Chaundy | 297/376 X |
| 5,249,840 | 10/1993 | Hoshihara et al. | 297/378.12 |
| 5,425,568 | 6/1995 | Sliney et al. | 297/378.12 X |
| 5,433,507 | 7/1995 | Chang | 297/378.12 X |
| 5,454,624 | 10/1995 | Anglade et al. | 297/387.12 X |
| 5,460,429 | 10/1995 | Whalen | 297/378.12 X |
| 5,577,805 | 11/1996 | Glinter et al. | 297/378.12 |
| 5,641,202 | 6/1997 | Rus | 297/378.12 X |
| 5,664,838 | 9/1997 | Baloche | 297/378.12 |
| 5,725,279 | 3/1998 | Ward et al. | 297/376 X |

FOREIGN PATENT DOCUMENTS 516593  12/1992  European Pat. Off. .......... 297/378.13

*Primary Examiner*—Peter M. Cuomo
*Assistant Examiner*—Rodney B. White
*Attorney, Agent, or Firm*—John Lezdey & Assoc

[57] ABSTRACT

There is provided a joint fitting of a backrest for a motor vehicle seat, which has a first part of a joint, which is arranged at a seat frame (22) and a second part of a joint, which is arranged at a back of the seat (24), whereby both parts of the joint are adjustable towards each other via an adjustment device, for the reason of which one axis (32) of one part of the joint protrudes into a recess of the other part of the joint, the recess is a long hole (30), within which the axis (32) is guided on a dictated path.

11 Claims, 2 Drawing Sheets

JOINT FITTING OF A BACKREST FOR A MOTOR VEHICLE SEAT

FIELD OF THE INVENTION

The invention relates to a joint fitting of a backrest for a motor vehicle seat, which has a first part of a joint, which is arranged at a seat frame and a second part of a joint, which is arranged at a back of the seat, whereby both parts of the joint are adjustable towards each other via an adjustment device, for the reason of which one axis of one part of the joint protrudes into a recess of the other part of the joint.

BACKGROUND OF THE INVENTION

Such joint fittings of a backrest are known in various embodiments. Their disadvantage is that the tilting angle of the back rest is not sufficiently wide enough, it is especially unsuccessful with the known joint fittings of a backrest to tilt the backrest forward to such an extent that the surface of the backrest runs nearly horizontally, namely that the backrest takes a so-called fixation of a table. The problems exists at the position of the swiveling point of the fitting of the backrest. With a progressing forward tilting of the backrest its upholstery comes into contact with the upper side of the upholstery of the seating area, a further tilting forward is thereby limited. With the fittings of a backrest used in today's typical motor vehicles, the backrest can only be tilted into one position, in which its back surface still includes a clear angle with the horizontal line, for example an angle of 30 degrees.

This is where the invention sets in. It is the task of the invention to further develop and put into practice a fitting of the backrest based on the known fittings of the backrest of the above mentioned kind in such a way that a larger adjustment angle of the backrest is achieved with regard to the seat frame, especially that a table function can be achieved of the backrests in a tilted forward position, whereby the minor condition should exist that the swiveling movement should work with only one single adjustment device as before.

Based on the known fitting of the backrest of the above mentioned kind, this task is solved in such a way that the recess is a long hole, within which the axes is guided on a dictated path.

In contrary to the known fittings of the backrest, the axis of the fitting of the backrest has no positioned fixation the axis can much rather move within the long hole. Thereby it is possible, that the axis can move during the tilting movement within the long hole and can thereby be positioned so high, that a real table function is achieved.

SUMMARY OF THE INVENTION

Just like it is possible with the known fitting of the backrest, the invention makes it possible to arrange the axis in the usual, deep arrangement within the fitting and with regard to the entire motor vehicle seat. During the normal adjustment movements between the resting position of the backrest and a backrest, which is tilted forward so far that an entrance aid is provided for the front seats, the axis stays at a final area of the long hole, preferably at the deepest position of the long hole. If the backrest is supposed to be tilted forward further than its position "entrance aid", then the possibility is used that the axis can travel upwards within the long hole. Thereby the backward area of the backrest can be lifted up in such a sufficient way that the backrest moves into a more or less horizontal line. The horizontal position is defined thereby that the backrest with its front side hits the front part at the top side of the seating area namely near the front edge of the seat. The axis has to be lifted up within the long hole so high that the backward surface of the backrest is nearly horizontal. This movement is made possible by the invention.

The invention uses an adjustment device for example, as it is known from the state of the art. It is made possible by suitable spacial arrangement of the long hole, to further use the adjustment device beside its task to perform an angle adjustment also in such a way that it effects the movement of the axis within the long hole. Hereby it can be advantageous to prestress the axis within the long hole in a final position in an elastic manner, for example the lower one.

DESCRIPTION OF THE PREFERRED EMBODIMENTS

A preferred embodiment of the adjustment device in relation to the arrangement of the axis and the long hole derives from that the part of the joint, in which the long hole is formed, has an adjustment path running in a cam shaped way. It is part of the adjustment device. A turnable adjusting part works together with it, which moves along the adjustment path when turned. In a preferred embodiment, the adjustment path and the turnable adjusting part are in meshing with each other, the adjustment path is therefore interlocked and the turnable adjusting part is embodied as a pinion.

In a preferred embodiment die adjustment path has at least two sectional areas, one of which runs on a reference circle, which is centrical to one point of the long hole, preferably a point, which corresponds to a final position of the axis within the long hole. The further sectional area is a so-called adjusting area. If the turnable adjusting part is positioned in the adjusting area, the axis is moved within the long hole.

In a further preferred embodiment the adjustment path has three sectional areas, namely also a reference circle area at the other end of the adjusting area, which is called a second reference circle area. Thereby it is possible to perform an angle adjustment of the backrest in both ends of travel of the axis within their long hole.

In a preferred embodiment the long hole consists of two essentially staight-lined parts, runnig towards each other in a sharp angle. Thereby each part forms a final area. Preferably one part is markedly shorter than the other, for example three to five times shorter.

Further advantages and characteristics of the invention derive from the other claims as well as the following description of a non-restrictve embodiment of the invention, which is illustrated further with regard to the only graphical representation. This representation shows a side view of a motor vehicle seat with the fitting of the backrest according to the invention, the position of the backrest is illustrated in the normal position of use and furthermore three further different positions of the angle are indicated.

Figure 1:
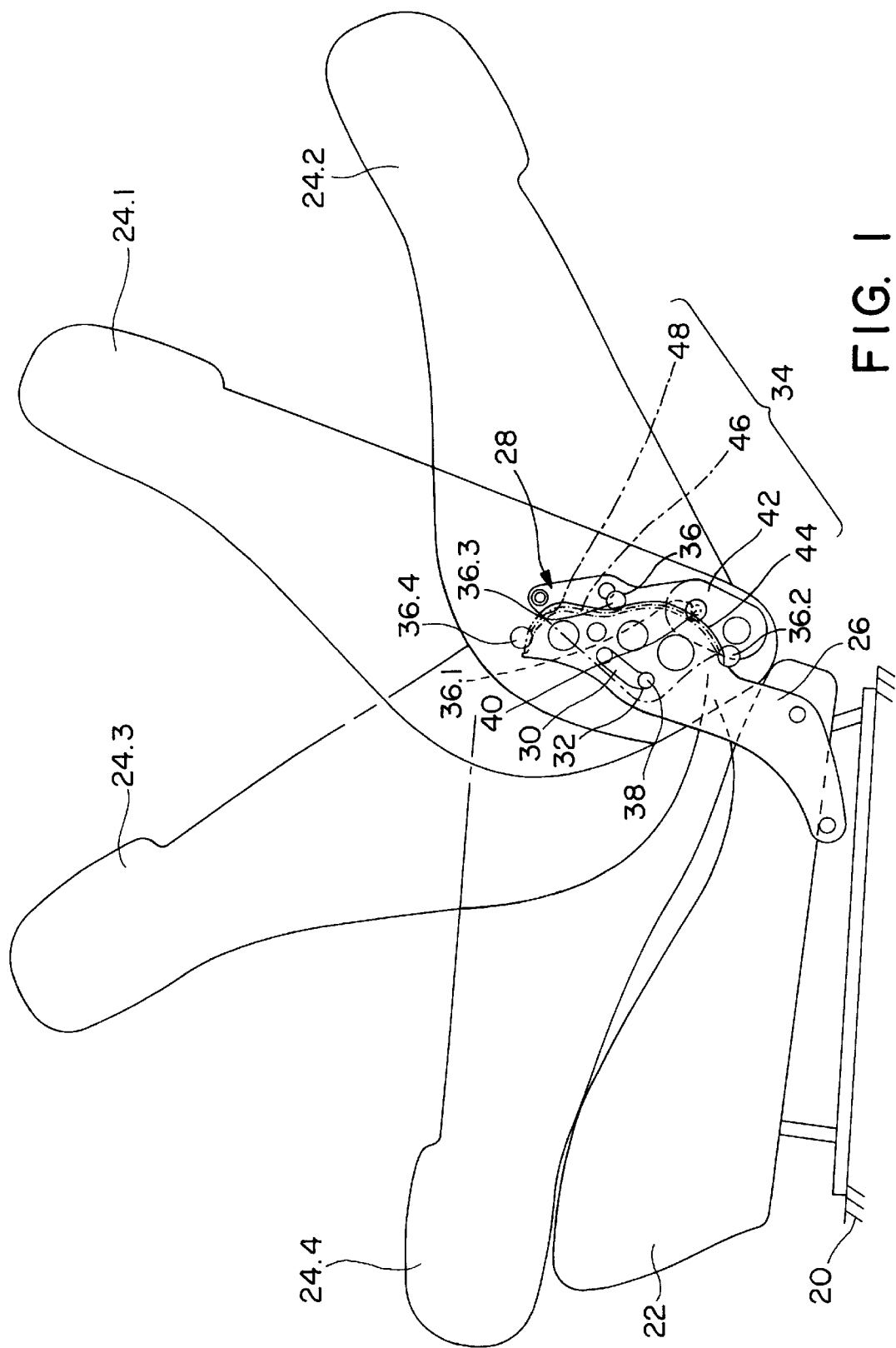
FIG. 1 graphically illustrates a sideview of a motor vehicle seat with the fitting of the backrest according to the invention.

FIG. 1 shows a motor vehicle seat, especially a front seat of a motor vehicle, which is connected via an underframe, only indicated here, with an understructure of the body 20 of a motor vehicle. The seat has a seat frame 22 and a backrest 24. Both are connected with each other via a fitting of the backrest, it has a first part of the joint 26, which is arranged at the seat frame 22, and a second part of the joint 28 which is attached to the backrest 24. As it is normal with motor vehicles, these arrangements are provided at both sides of the seat, namely they exist twice per motor vehicle seat. As it is also normal, those two side fittings of the backrest can be operated mutually and are synchronized in their operation. This fact will be explained further in the following.

Figure 2:
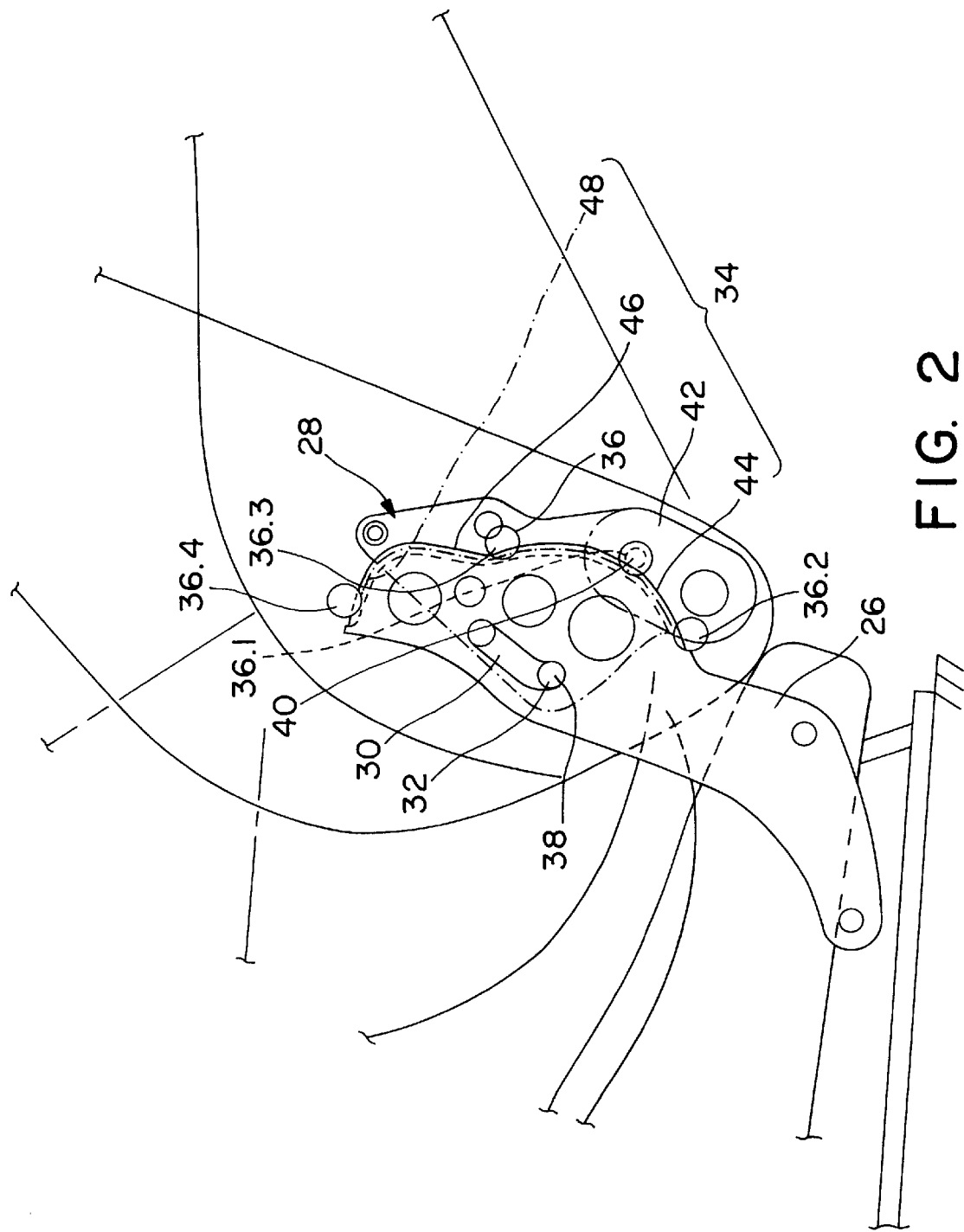
FIG. 2 is an enlarged closeup of the joint fitting shown in FIG. 1.

As can be seen from the FIG. 2, the first part of the joint 26 has a long hole 30 in the illustrated embodiment. An axis 32 engages into it, which is connected to the second part of the joint 28. The axis 32 is guided in the long hole 30 in such a way that it can only be moved along a dictated path. Any play of the axis 32 within the long hole 30, which is lateral to this dictated path, is to be prevented. Hereby suitable measures are to be used as known from the state of the art.

As can be seen from the FIG. 2, the axis 32 has two final positions within the long hole 30, both of which are illustrated in the figure. In the lower final position, the axis 32 in the upper final position it is only indicated by a circular line. The long hole 30 runs essentially crosswise to the horizontal line, namely crosswise to the understructure of the body 20, the backrest 24 is pivotal around the axis 32, any desired swiveling position achieved, can be fixed mechanically. Hereby an additional special device can be provided, but this is not basically necessary with a suitable embodiment of the adjustment device.

To the adjustment device belongs an adjustment path 34 on one hand, which is embodied in the illustrated embodiment FIG. 2 along a side edge of the first part of the joint 26, and on the other hand a turnable adjusting part 36, which is embodied in the illustrated embodiment FIG. 2 by a pinion, which is either driven by a hand wheel or also by power. It should be added at this point that only a preferred embodiment of the invention is described. Other embodiments of the adjustment device are also suitable for the embodiment of the invention which also make it possible, just like the illustrated embodiment FIG. 2, that both parts of the joint 26,28 can either be swiveled around the central line 38 of the axis 32 as well as to enable a definite allocation between the movement of the adjustment device and location of the axis 32 within the long hole 30.

The turning adjusting part 36 and the axis 32 always have a strictly dictated distance from each other. To express the fact more precisely, the distance of the central line 38 and the axis 32 and a central line 40 of the turning adjusting part 36, which is parallel to it, is precisely dictated. The connecting distance of both central lines carries the reference number 42.

The adjustment path 34 has two sectional areas at least, namely a first reference circle area 44, which is centrical to the central line 38 of the axis 32 in its lowest position, and an adjustment area 46. As long as the first reference circle area 44 is crossed by the turning adjusting part 36, an angle adjustment of the backrest 24 occurs. If the turning adjusting part 36 is positioned in the adjustment area 46, a linear movement of the axis 32 occurs within the long hole 30 and does not prefer a tilting movement of the backrest. If additionally to the linear movement a tilting of the backrest 24 also occurs within tie adjustment area 46, which is possible according to the invention by all means, then both movements are coupled in a compulsory way. In the illustrated embodiment, the ajustment path has a further sectional area, namely a second reference circle area 48. It runs in a centrical way to the axis 32 in its top position within the long hole 30. As can be seen from the figure, the entire adjustment path runs in a constant progression. Thereby the transitions also run in a constant progression among the areas 44, 46 and 48.

The adjusting area 46 and the course of the long hole 30 are essentially parallel. Thereby an adjustment of the axis 32 within the long hole 32 essentially leads to a higher position of the backrest 24, without any additional alteration of its inclination. Generally an angle adjustment of the backrest 24 can also be achieved within the adjustment area 46.

As can be seen from FIG. 2, the adjustment distance 42 is positioned in a sharp angle to the course of the long hole 30 and the adjustment area 46. That way a definite allocation between the position of the axis 32 and the position of the turnable adjusting part 36 is achieved and the arrangement is without play, if possible.

As can be seer from FIG. 2, the long hole 30 is constructed of two straight-lined parts, which are at an angle towards each other at an angle of about 45 degrees. The lower part is distinctly shorter than the upper part.

For the synchronization of two fittings for the backrest on both sides of a motor vehicle seat, the two turnable adjusting parts are connected with each other via a mutual shaft.

In the following the function is described. Based on the normal position of the backrest, which is referred to as 24.1 in FIG. 2, the backrest 24 can be swiveled around the axis 32 in the resting position 24.2 and the position entrance aid backwards 24.3. Thereby the axis 32 stays in the lowest position within the long hole 30. If one wants to swivel the backrest 24 further forward via the position 24.3 (entrance aid to the back), namely into the position with the reference number 24.4 "table function", the following processes occur; The tunable adjusting part 36 is moved from the first reference circle area 44 into the adjustment area 46 by turning the respective pinion, because of that the axis 32 leaves its lowest, deepest position within the long hole 30, it travels upwards until it reaches the upper final position, which is illustrated in FIG. 2 only by a straight circle. Within this final position, another angle adjustment is possible, the backrest is swiveled into the illustrated final position 24.4 with the adjustment device, which is turned further in the same direction. On the backward path the processes occur in just the same way only in the opposite direction, or sequence. The positions of the turnable adjusting part, which belong to the respective positions of the backrests are referred to with the numbers 24.2, 24.3 and 24.4.

What is claimed is:

1. A joint fitting of a backrest for a motor vehicle seat, which has a first part of a joint, which is arranged at a seat frame and a second part of a joint which is arranged at a side of said backrest of the seat, whereby both parts of the joint are angularly adjustable towards each other via an adjustment device;

said second part having a pivoting axis and a turnable adjusting part having a rotatable axis;

said first part having a long hole, said long hole having a lower portion and an upper portion, the lower portion shorter than the upper portion and providing a dictated path for pivoting a axis, and an adjustment path for the turnable adjusting part, the adjustable turnable part being rotatable;

said adjustment device comprising in cooperative combination said pivoting axis linearly movable within the dictated path and;

said turnable adjusting part having a rotatable axis movable along the adjustment path;

said adjustment path comprises at least two sectional areas comprising:
  a) a first reference circle area which is centrical to the central line of a pivoting axis in a lowest position within the long hole;
  b) a second reference circle area which is centrical to the central line of a pivoting axis in a highest position within the long hole; and
wherein said adjusting path is essentially parallel to a corresponding portion of said long hole, so that an adjustment of the turnable adjusting part activates a rotation between said first and second part around said pivoting axis and the turnable adjusting part cooperates with said first reference circle area of said adjustment path, and in another adjustment of the turnable adjusting part which cooperates with said second reference circle area of said adjustment path and leads to a linear movement of said pivoting axis.

2. The joint fitting of a backrest according to claim 1 wherein said highest position within said long hole of the pivoting axis is a point corresponding to a final position within said long hole.

3. The joint fitting of a backrest according to claim 1 wherein the adjustment path has a second reference circle area, which runs in a centrical way to a point on the adjustment path, which corresponds to a position of the pivoting axis in the long hole.

4. The joint fitting of a backrest according to claim 3 wherein the adjustment path has two final areas, one final area thereof being formed by an end of said first reference circle area and the other final area thereof being formed by an end of said second reference circle area.

5. The joint fitting of a backrest according to claim 1 wherein the sectional areas of the adjustment path are continuous.

6. The joint fitting of a backrest according to claim 1, wherein a desired position of the pivoting axis within the long hole corresponds in a definite manner to a position of the adjustment device on its adjustment path between 10 and 60 degrees.

7. The joint fitting of a backrest according to claim 1 wherein said turnable adjusting part is a pinion.

8. The joint fitting of a backrest according to claim 1 wherein said pivoting axis and a rotary axis of said turnable adjusting part run in parallel.

9. The joint fitting of a backrest according to claim 8 wherein said pivoting axis and said turnable adjusting part are arranged in a fixed mutual distance.

10. The joint fitting of a backrest according to claim 1 wherein the backrest can be moved into an essentially horizontal position.

11. The joint fitting of a backrest according to claim 1 wherein a connecting line of the pivoting axis and the adjustment device performs a change of the angle of about 90 degrees during a movement of the turnable adjusting part along the adjustment path from one end of the adjustment path to an opposite end of the adjustment path.

* * * * *